United States Patent
Rust et al.

(10) Patent No.: US 9,195,500 B1
(45) Date of Patent: Nov. 24, 2015

(54) METHODS FOR SEAMLESS STORAGE IMPORTING AND DEVICES THEREOF

(75) Inventors: Stephen Rust, Westborough, MA (US); Michael Andrews, Stow, MA (US); Brian Meifert, Clinton, MA (US)

(73) Assignee: F5 Networks, Inc., Seattle, WA (US)

(*) Notice: Subject to any disclaimer, the term of this patent is extended or adjusted under 35 U.S.C. 154(b) by 1248 days.

(21) Appl. No.: 13/024,147

(22) Filed: Feb. 9, 2011

Related U.S. Application Data

(60) Provisional application No. 61/302,864, filed on Feb. 9, 2010.

(51) Int. Cl.
*G06F 12/00* (2006.01)
*G06F 9/48* (2006.01)
*G06F 3/06* (2006.01)

(52) U.S. Cl.
CPC ............ *G06F 9/4862* (2013.01); *G06F 3/0643* (2013.01)

(58) Field of Classification Search
USPC ........................................................ 711/154
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |
| 5,550,965 A | 8/1996 | Gabbe et al. | |
| 5,583,995 A | 12/1996 | Gardner et al. | |
| 5,586,260 A | 12/1996 | Hu | |
| 5,590,320 A | 12/1996 | Maxey | |
| 5,623,490 A | 4/1997 | Richter et al. | |
| 5,649,194 A | 7/1997 | Miller et al. | |
| 5,649,200 A | 7/1997 | Leblang et al. | |
| 5,668,943 A | 9/1997 | Attanasio et al. | |

(Continued)

FOREIGN PATENT DOCUMENTS

| AU | 2003300350 A1 | 7/2004 |
|---|---|---|
| CA | 2080530 A1 | 4/1994 |

(Continued)

OTHER PUBLICATIONS

Improving recoverability in multi-tier storage system Kiran-Kumar Muniswamy-Reddy Mustafa Uysal*. *HP labs. Palo Alto, CA, USA and Harvad Univeristy, Cambidage, MA, USA.*

(Continued)

*Primary Examiner* — Jared Rutz
*Assistant Examiner* — Hamdy S Ahmed
(74) *Attorney, Agent, or Firm* — LeClairRyan, a Professional Corporation

(57) ABSTRACT

A method, non-transitory computer readable medium and device for seamless storage import includes importing file system structure entries stored in one or more storage devices. A request for an operation on one of the entries in the one or more storage devices is obtained during the importing. An import status of the requested one of the entries is determined. The obtained request is processed based on the determined import status of the requested one of the entries without interrupting the importing. The requested one of the entries is updated with the storage management computing device based on the processing. An aggregation of the imported entries with the updating of the requested one of the entries is stored.

21 Claims, 10 Drawing Sheets

(56) References Cited

U.S. PATENT DOCUMENTS

| | | | |
|---|---|---|---|
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,889,935 A | 3/1999 | Ofek et al. |
| 5,893,086 A | 4/1999 | Schmuck et al. |
| 5,897,638 A | 4/1999 | Lasser et al. |
| 5,901,327 A | 5/1999 | Ofek |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,044,444 A | 3/2000 | Ofek |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,329,985 B1 | 12/2001 | Tamer et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,374,336 B1 | 4/2002 | Peters et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,654,346 B1 | 11/2003 | Mahalingaiah et al. |
| 6,697,871 B1 | 2/2004 | Hansen |
| 6,704,755 B2 | 3/2004 | Midgley et al. |
| 6,721,794 B2 | 4/2004 | Taylor et al. |
| 6,728,265 B1 | 4/2004 | Yavatkar et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,757,706 B1 | 6/2004 | Dong et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,868,439 B2 | 3/2005 | Basu et al. |
| 6,871,245 B2 | 3/2005 | Bradley |
| 6,880,017 B1 | 4/2005 | Marce et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,003,533 B2 | 2/2006 | Noguchi et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,024,427 B2 | 4/2006 | Bobbitt et al. |
| 7,039,061 B2 | 5/2006 | Connor et al. |
| 7,051,112 B2 | 5/2006 | Dawson |
| 7,054,998 B2 | 5/2006 | Arnott et al. |
| 7,072,917 B2 | 7/2006 | Wong et al. |
| 7,075,924 B2 | 7/2006 | Richter et al. |
| 7,089,286 B1 | 8/2006 | Malik |
| 7,111,115 B2 | 9/2006 | Peters et al. |
| 7,113,962 B1 | 9/2006 | Kee et al. |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,194,579 B2 | 3/2007 | Robinson et al. |
| 7,197,615 B2 | 3/2007 | Arakawa et al. |
| 7,219,260 B1 | 5/2007 | de Forest et al. |
| 7,234,074 B2 | 6/2007 | Cohn et al. |
| 7,236,491 B2 | 6/2007 | Tsao et al. |
| 7,237,076 B2 | 6/2007 | Nakano et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,308,475 B1 | 12/2007 | Pruitt et al. |
| 7,343,398 B1 | 3/2008 | Lownsbrough |

(56) References Cited

U.S. PATENT DOCUMENTS

| | | |
|---|---|---|
| 7,346,664 B2 | 3/2008 | Wong et al. |
| 7,373,345 B2 | 5/2008 | Carpentier et al. |
| 7,373,520 B1 | 5/2008 | Borthakur et al. |
| 7,383,288 B2 | 6/2008 | Miloushev et al. |
| 7,383,463 B2 | 6/2008 | Hayden et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,656,788 B2 | 2/2010 | Ma et al. |
| 7,680,836 B2 | 3/2010 | Anderson et al. |
| 7,685,126 B2 | 3/2010 | Patel et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kirnos |
| 7,725,763 B2 | 5/2010 | Vertes et al. |
| 7,734,603 B1 | 6/2010 | McManis |
| 7,743,031 B1 | 6/2010 | Cameron et al. |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,805,470 B2 | 9/2010 | Armangau et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Mathew et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,903,554 B1 | 3/2011 | Manur et al. |
| 7,904,466 B1 | 3/2011 | Valencia et al. |
| 7,913,053 B1 | 3/2011 | Newland |
| 7,937,421 B2 | 5/2011 | Mikesell et al. |
| 7,953,085 B2 | 5/2011 | Chang et al. |
| 7,953,701 B2 | 5/2011 | Okitsu et al. |
| 7,958,347 B1 | 6/2011 | Ferguson |
| 7,984,108 B2 | 7/2011 | Landis et al. |
| 8,005,953 B2 | 8/2011 | Miloushev et al. |
| 8,010,756 B1 * | 8/2011 | Linde ............ 711/161 |
| 8,046,547 B1 | 10/2011 | Chatterjee et al. |
| 8,074,107 B2 | 12/2011 | Sivasubramanian et al. |
| 8,103,622 B1 | 1/2012 | Karinta |
| 8,112,392 B1 | 2/2012 | Bunnell et al. |
| 8,171,124 B2 | 5/2012 | Kondamuru |
| 8,180,747 B2 | 5/2012 | Marinkovic et al. |
| 8,195,760 B2 | 6/2012 | Lacapra et al. |
| 8,204,860 B1 | 6/2012 | Ferguson et al. |
| 8,209,403 B2 | 6/2012 | Szabo et al. |
| 8,239,354 B2 | 8/2012 | Lacapra et al. |
| 8,271,751 B2 | 9/2012 | Hinrichs, Jr. |
| 8,306,948 B2 | 11/2012 | Chou et al. |
| 8,326,798 B1 | 12/2012 | Driscoll et al. |
| 8,351,600 B2 | 1/2013 | Resch |
| 8,352,785 B1 | 1/2013 | Nicklin et al. |
| 8,392,372 B2 | 3/2013 | Ferguson et al. |
| 8,396,895 B2 | 3/2013 | Miloushev et al. |
| 8,397,059 B1 | 3/2013 | Ferguson |
| 8,400,919 B1 | 3/2013 | Amdahl et al. |
| 8,417,681 B1 | 4/2013 | Miloushev et al. |
| 8,417,746 B1 | 4/2013 | Gillett, Jr. et al. |
| 8,433,735 B2 | 4/2013 | Lacapra |
| 8,463,850 B1 | 6/2013 | McCann |
| 8,468,542 B2 | 6/2013 | Jacobson et al. |
| 8,498,951 B1 | 7/2013 | Baluja et al. |
| 8,548,953 B2 | 10/2013 | Wong et al. |
| 8,549,582 B1 | 10/2013 | Andrews et al. |
| 8,572,007 B1 | 10/2013 | Manadhata et al. |
| 8,576,283 B1 | 11/2013 | Foster et al. |
| 8,595,547 B1 | 11/2013 | Sivasubramanian et al. |
| 8,620,879 B2 | 12/2013 | Cairns |
| 8,676,753 B2 | 3/2014 | Sivasubramanian et al. |
| 8,682,916 B2 | 3/2014 | Wong et al. |
| 8,745,266 B2 | 6/2014 | Agarwal et al. |
| 2001/0007560 A1 | 7/2001 | Masuda et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0178410 A1 | 11/2002 | Haitsma et al. |
| 2002/0188667 A1 | 12/2002 | Kirnos |
| 2002/0194342 A1 | 12/2002 | Lu et al. |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1 | 4/2003 | Belapurkar et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0140210 A1 | 7/2003 | Testardi |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0098595 A1 | 5/2004 | Aupperle et al. |
| 2004/0133577 A1 | 7/2004 | Miloushev et al. |

(56) References Cited

U.S. PATENT DOCUMENTS

| | | |
|---|---|---|
| 2004/0133606 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0210731 A1* | 10/2004 | Chatterjee et al. ............ 711/165 |
| 2004/0213156 A1 | 10/2004 | Smallwood et al. |
| 2004/0236798 A1 | 11/2004 | Srinivasan et al. |
| 2004/0250032 A1 | 12/2004 | Ji et al. |
| 2005/0021615 A1 | 1/2005 | Arnott et al. |
| 2005/0027862 A1 | 2/2005 | Nguyen et al. |
| 2005/0050107 A1 | 3/2005 | Mane et al. |
| 2005/0071589 A1 | 3/2005 | Tross et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0160243 A1 | 7/2005 | Lubbers et al. |
| 2005/0175013 A1 | 8/2005 | Le Pennec et al. |
| 2005/0187866 A1 | 8/2005 | Lee |
| 2005/0193245 A1 | 9/2005 | Hayden et al. |
| 2005/0198501 A1 | 9/2005 | Andreev et al. |
| 2005/0213587 A1 | 9/2005 | Cho et al. |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0112399 A1 | 5/2006 | Lessly |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0206547 A1 | 9/2006 | Kulkarni et al. |
| 2006/0212746 A1 | 9/2006 | Amegadzie et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2006/0294164 A1 | 12/2006 | Armangau et al. |
| 2007/0016754 A1 | 1/2007 | Testardi |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0061441 A1 | 3/2007 | Landis et al. |
| 2007/0088702 A1 | 4/2007 | Fridella et al. |
| 2007/0136308 A1 | 6/2007 | Tsirigotis et al. |
| 2007/0139227 A1 | 6/2007 | Speirs, II et al. |
| 2007/0150481 A1 | 6/2007 | Song et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0226331 A1 | 9/2007 | Srinivasan et al. |
| 2007/0239944 A1 | 10/2007 | Rupanagunta et al. |
| 2007/0260830 A1 | 11/2007 | Faibish et al. |
| 2008/0046432 A1 | 2/2008 | Anderson et al. |
| 2008/0070575 A1 | 3/2008 | Claussen et al. |
| 2008/0104347 A1 | 5/2008 | Iwamura et al. |
| 2008/0104443 A1 | 5/2008 | Akutsu et al. |
| 2008/0114718 A1 | 5/2008 | Anderson et al. |
| 2008/0189468 A1 | 8/2008 | Schmidt et al. |
| 2008/0200207 A1 | 8/2008 | Donahue et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0037500 A1 | 2/2009 | Kirshenbaum |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0161542 A1 | 6/2009 | Ho |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0240705 A1 | 9/2009 | Miloushev et al. |
| 2009/0240899 A1 | 9/2009 | Akagawa et al. |
| 2009/0254592 A1 | 10/2009 | Marinov et al. |
| 2009/0265396 A1 | 10/2009 | Ram et al. |
| 2009/0313503 A1 | 12/2009 | Atluri et al. |
| 2010/0017643 A1 | 1/2010 | Baba et al. |
| 2010/0030777 A1 | 2/2010 | Panwar et al. |
| 2010/0061232 A1 | 3/2010 | Zhou et al. |
| 2010/0082542 A1 | 4/2010 | Feng et al. |
| 2010/0122248 A1 | 5/2010 | Robinson et al. |
| 2010/0199042 A1 | 8/2010 | Bates et al. |
| 2010/0205206 A1 | 8/2010 | Rabines et al. |
| 2010/0211547 A1 | 8/2010 | Kamei et al. |
| 2010/0325257 A1 | 12/2010 | Goel et al. |
| 2010/0325634 A1 | 12/2010 | Ichikawa et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0099146 A1 | 4/2011 | McAlister et al. |
| 2011/0099420 A1 | 4/2011 | McAlister et al. |
| 2011/0107112 A1 | 5/2011 | Resch |
| 2011/0119234 A1 | 5/2011 | Schack et al. |
| 2011/0296411 A1 | 12/2011 | Tang et al. |
| 2011/0320882 A1 | 12/2011 | Beaty et al. |
| 2012/0042115 A1 | 2/2012 | Young |
| 2012/0078856 A1 | 3/2012 | Linde |
| 2012/0144229 A1 | 6/2012 | Nadolski |
| 2012/0150699 A1 | 6/2012 | Trapp et al. |
| 2013/0007239 A1 | 1/2013 | Agarwal et al. |
| 2013/0058252 A1 | 3/2013 | Casado et al. |
| 2013/0058255 A1 | 3/2013 | Casado et al. |

FOREIGN PATENT DOCUMENTS

| | | |
|---|---|---|
| CA | 2512312 A1 | 7/2004 |
| EP | 0605088 A3 | 2/1996 |
| EP | 0 738 970 A1 | 10/1996 |
| JP | 63010250 A | 1/1988 |
| JP | 6205006 A | 7/1994 |
| JP | 06-332782 | 12/1994 |
| JP | 8021924 B | 3/1996 |
| JP | 08-328760 | 12/1996 |

(56) References Cited

FOREIGN PATENT DOCUMENTS

| | | |
|---|---|---|
| JP | 08-339355 | 12/1996 |
| JP | 9016510 A | 1/1997 |
| JP | 11282741 A | 10/1999 |
| JP | 2000-183935 | 6/2000 |
| NZ | 566291 A | 12/2008 |
| WO | 02/39696 A2 | 5/2002 |
| WO | WO 02/056181 A2 | 7/2002 |
| WO | WO 2004/061605 A2 | 7/2004 |
| WO | 2006091040 A1 | 8/2006 |
| WO | WO 2008/130983 A1 | 10/2008 |
| WO | WO 2008/147973 A2 | 12/2008 |

OTHER PUBLICATIONS

"The AFS File System in Distributed Computing Environment," www.transarc.ibm.com/Library/whitepapers/AFS/afsoverview. html, last accessed on Dec. 20, 2002.

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson, Darrell C. et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, Association for Computing Machinery, Inc.

Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).

Apple, Inc., "Mac OS X Tiger Keynote Intro. Part 2," Jun. 2004, www.youtube.com<http://www.youtube.com/watch?v=zSBJwEmRJbY>, p. 1.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/sp otlight.html>, pp. 1-6.

"A Storage Architecture Guide," Second Edition, 2001, Auspex Systems, Inc., www.auspex.com, last accessed on Dec. 30, 2002.

Basney et al., "Credential Wallets: A Classification of Credential Repositories Highlighting MyProxy," Sep. 19-21, 2003, pp. 1-20, 31$^{st}$ Research Conference on Communication, Information and Internet Policy (TPRC 2003), Arlington, Virginia.

Botzum, Keys, "Single Sign on—A Contrarian View," Aug. 6, 2001, pp. 1-8, Open Group Website, http://www.opengroup.org/security/topics.htm.

Cabrera et al., "Swift: A Storage Architecture for Large Objects," In Proceedings of the-Eleventh IEEE Symposium on Mass Storage Systems, Oct. 1991, pp. 123-128.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.

Cavale, M. R., "Introducing Microsoft Cluster Service (MSCS) in the Windows Server 2003", Microsoft Corporation, Nov. 2002.

"CSA Persistent File System Technology," A White Paper, Jan. 1, 1999, p. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www. eu.microsoft.com/TechNet/prodtechnol/windows2000serv/maintain/DFS nt95>, pp. 1-26, last accessed on Dec. 20, 2002.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks," Jan. 2000, McGraw Hill, ISBN 0072120509.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm. com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

International Search Report for International Patent Application No. PCT/US 2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT /US02/00720, Jul. 8, 2004.

International Search Report from International Application No. PCT/US03/41202, mailed Sep. 15, 2005.

Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13Th LISA Conf., 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510. txt?number=1510).

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Long et al., "Swift/RAID: A distributed RAID System", Computing Systems, Summer 1994, vol. 7, pp. 333-359.

(56) References Cited

OTHER PUBLICATIONS

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, Storage Networking Industry Association (SNIA), www.snia.org, last accessed on Mar. 26, 2001.

Novotny et al., "An Online Credential Repository for the Grid: MyProxy," 2001, pp. 1-8.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, Jun. 1990, pp. 1-4, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Response filed Jul. 6, 2007 to Office action dated Feb. 6, 2007 for related U.S. Appl. No. 10/336,784.

Response filed Mar. 20, 2008 to Final Office action dated Sep. 21, 2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph -p. 868, col. 1, paragraph 1.

RSYNC, "Welcome to the RSYNC Web Pages," Retrieved from the Internet URL: http://samba.anu.edu.ut.rsync/. (Retrieved on Feb. 18, 2009).

Savage, et al., "AFRAID—A Frequently Redundant Array of Independent Disks," Jan. 22-26, 1996, pp. 1-13, USENIX Technical Conference, San Diego, California.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

Soltis et al., "The Global File System," Sep. 17-19, 1996, in Proceedings of the Fifth NASA Goddard Space Flight Center Conference on Mass Storage Systems and Technologies, College Park, Maryland.

Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.

Stakutis, C., "Benefits of SAN-based file system sharing," Jul. 2000, pp. 1-4, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, pp. 1-14, Association for Computing Machinery, Inc.

Tulloch, Mitch, "Microsoft Encyclopedia of Security," 2003, pp. 218, 300-301, Microsoft Press, Redmond, Washington.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"Veritas SANPoint Foundation Suite(tm) and SANPoint Foundation Suite(tm) HA: New Veritas Volume Management and File System Technology for Cluster Environments," Sep. 2001, Veritas Software Corp.

Wilkes, J., et al., "The HP AutoRAID Hierarchical Storage System," Feb. 1996, vol. 14, No. 1, ACM Transactions on Computer Systems.

"Windows Clustering Technologies-An Overview," Nov. 2001, Microsoft Corp., www.microsoft.com, last accessed on Dec. 30, 2002.

Zayas, E., "AFS-3 Programmer's Reference: Architectural Overview," Transarc Corp., version 1.0 of Sep. 2, 1991, doc. No. FS-00-D160.

Gupta et al., "Algorithms for Packet Classification", Computer Systems Laboratory, Stanford University, CA, Mar./Apr. 2001, pp. 1-29.

Heinz II G., "Priorities in Stream Transmission Control Protocol (SCTP) Multistreaming", Thesis submitted to the Faculty of the University of Delaware, Spring 2003, pp. 1-35.

Internet Protocol,"DARPA Internet Program Protocol Specification", (RFC:791), Information Sciences Institute, University of Southern California, Sep. 1981, pp. 1-49.

Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Modiano E., "Scheduling Algorithms for Message Transmission Over a Satellite Broadcast System," MIT Lincoln Laboratory Advanced Network Group, Nov. 1997, pp. 1-7.

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

Rosen E., et al., "MPLS Label Stack Encoding", (RFC:3032) Network Working Group, Jan. 2001, pp. 1-22, (http://www.ietf.org/rfc/rfc3032.txt).

Wang B., "Priority and Realtime Data Transfer Over the Best-Effort Internet", Dissertation Abstract, Sep. 2005, ScholarWorks©UMASS.

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

METHODS FOR SEAMLESS STORAGE IMPORTING AND DEVICES THEREOF

This application claims the benefit of U.S. Provisional Patent Application Ser. No. 61/302,864, filed Feb. 9, 2010, which is hereby incorporated by reference in its entirety.

FIELD

This technology generally relates to methods and devices for appartuses for importing file systems and, more particularly, to methods for seamless storage importing of file systems and devices thereof.

BACKGROUND

In a virtualized storage environment, the virtualization device maintains metadata comprising all file system entries for all virtualized storage devices. The initial inventory scan (storage import) of the backend file systems builds the metadata. This storage import involves the virtualization device walking the entire directory structure to enumerate every file and directory in the backend file systems. It is critical that the file system entries are accurate and no incorrect entries exist in the metadata, and that no entries are missed. Depending on the dataset, storage import can take from minutes to several days or even weeks to complete.

During this time period, client querying and client operations that may result in file system changes are sent to the virtualization device and are expected to be handled and responses to in a timely manner. However, due to the nature and requirements of the storage import process described above, certain restrictions have been imposed on the types of client operations that are permitted during the data storage import to ensure that the client modifications do not compromise the integrity of the metadata.

Currently, directory modifications, such as directory renames or directory deletions, as well as certain file operations, are not allowed during the storage import scan. This is non-optimal at best and non-workable at worst in certain environments where clients may lose access to view or modify their files for long periods of time during the storage import process, which as mentioned earlier may take anywhere from hours to days/weeks. Additionally, in case of metadata failure where a rebuild of the metadata is required, these restrictions could easily interrupt the normal client workflow and impact operations with potential substantial costs.

SUMMARY

A method for seamless storage importing includes importing with a storage management computing device file system structure entries stored in one or more storage devices. A request for an operation on one of the entries in the one or more storage devices is obtained at the storage management computing device during the importing. An import status of the requested one of the entries is determined with the storage management computing device. The obtained request is processed with the storage management computing device based on the determined import status of the requested one of the entries without interrupting the importing. The requested one of the entries is updated with the storage management computing device based on the processing. An aggregation of the imported entries with the updating of the requested one of the entries is stored with the storage management computing device.

A non-transitory computer readable medium has stored thereon instructions for seamless storage importing comprising machine executable code which when executed by at least one processor, causes the processor to perform steps including importing file system structure entries stored in one or more storage devices. A request for an operation on one of the entries in the one or more storage devices is obtained during the importing. An import status of the requested one of the entries is determined. The obtained request is processed based on the determined import status of the requested one of the entries without interrupting the importing. The requested one of the entries is updated with the storage management computing device based on the processing. An aggregation of the imported entries with the updating of the requested one of the entries is stored.

A storage management computing device includes a memory coupled to the one or more processors which are configured to execute programmed instructions stored in the memory including importing file system structure entries stored in one or more storage devices. A request for an operation on one of the entries in the one or more storage devices is obtained during the importing. An import status of the requested one of the entries is determined. The obtained request is processed based on the determined import status of the requested one of the entries without interrupting the importing. The requested one of the entries is updated with the storage management computing device based on the processing. An aggregation of the imported entries with the updating of the requested one of the entries is stored.

This technology provides a number of advantages including providing more effective and efficient methods and devices for seamless storage importing of file systems. With this technology, file system operations are permitted during the storage import process. As a result, clients do not lose access to view or modify their files during the storage import process which could potentially take anywhere from hours to days/weeks. Additionally, while permitting files system operations during storage import, this technology still ensures that all imported file system and metadata entries are accurate.

DETAILED DESCRIPTION

Figure 1:
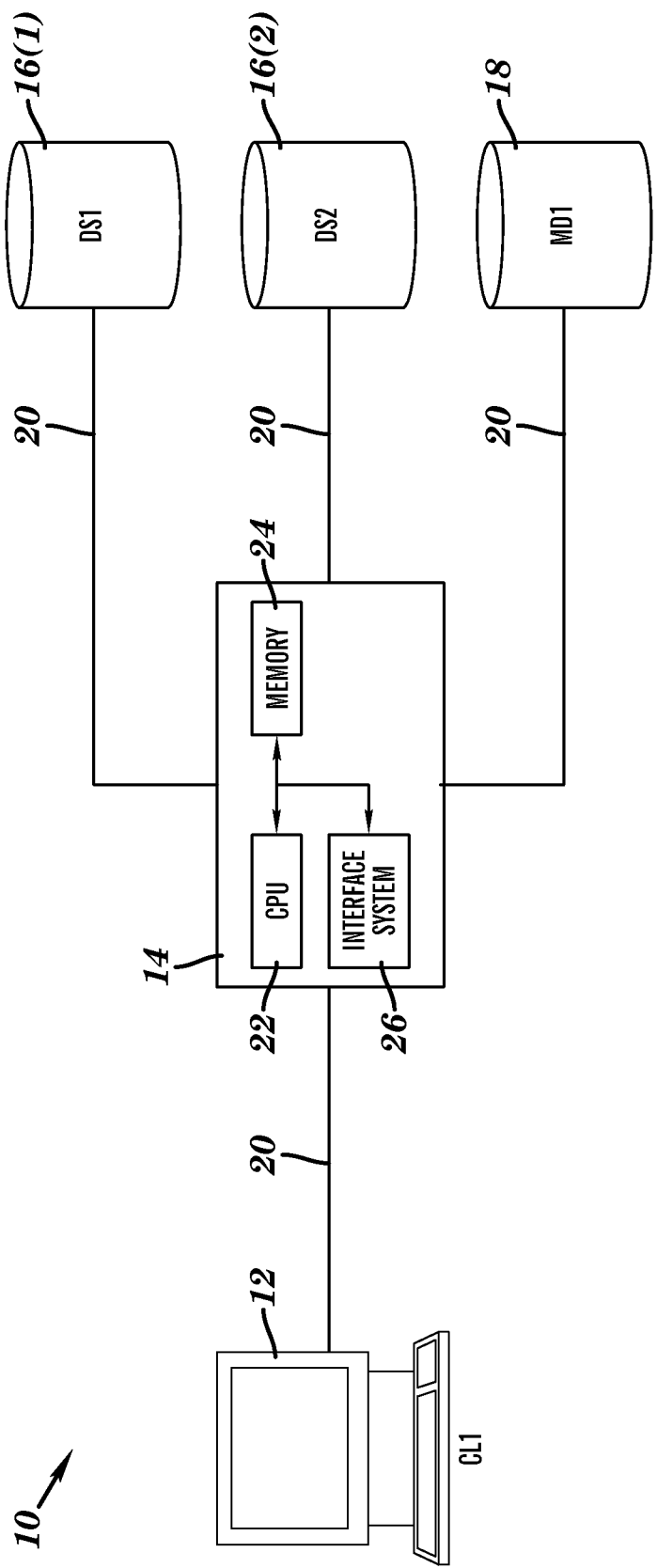
FIG. 1 is an environment with an exemplary storage management computing device for seamless storage import.

An environment 10 with an exemplary storage management computing device 14 for seamless storage import is illustrated in FIG. 1. The environment 10 includes the storage management computing device 14, a client computing device 12, data storage devices 16(1)-16(2), and a metadata storage device 18 which are all coupled together by one or more communication networks 20, although this environment can include other numbers and types of systems, devices, components, and elements in other configurations. This technology provides a number of advantages including providing methods and devices for seamlessly importing file systems.

The storage management computing device 14 provides seamless storage import from the data storage devices 16(1)-16(2) and the metadata storage device 18, although other numbers and types of systems could be used and other numbers and types of functions could be performed. The storage management computing device 14 includes a central processing unit (CPU) or processor 22, a memory 24, and an interface system 26 which are coupled together by a bus or other link, although other numbers and types of systems, devices, components, and elements in other configurations and locations can be used. The processor 22 in the storage management computing device 14 executes a program of stored instructions for one or more aspects of the present technology as described and illustrated by way of the examples herein, although other types and numbers of processing devices and logic could be used and the processor could execute other numbers and types of programmed instructions.

The memory 24 in the storage management computing device 14 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 22 in the storage management computing device 14, can be used for the memory 24 in the storage management computing device 14.

The interface system 26 in the storage management computing device 14 is used to operatively couple and communicate between the storage management computing device 14 and the client computing device 12 as well as the data storage devices 16(1)-16(2) and the metadata storage device 18 via one or more of the communications networks 20, although other types and numbers of communication networks or systems with other types and numbers of connections and configurations can be used. By way of example only, the one or more communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

The client computing device 12 utilizes the storage management computing device 14 to conduct one or more operations with one or more of the data storage devices 16(1)-16(2) and the metadata storage device 18, such as to store a file or directory, delete a file or directory, create a file or directory, or rename a file or directory by way of example only, although other numbers and types of systems could be utilizing these resources and other types and numbers of functions utilizing other types of protocols could be performed. Although one client computing device 12 is shown, other numbers and types of devices could be used to interact with the storage management computing device 14, the data storage devices 16(1)-16(2) and the metadata storage device 18. Similarly, other numbers and types of data storage devices and metadata storage devices could be used. Each of the data storage devices 16(1)-16(2) stores content, such as files and directories, although other numbers and types of storage systems which could have other numbers and types of functions and store other data could be used. The metadata storage server 18 stores metadata relating to the stored content, such as files and directories, on the data storage devices 16(1)-16(2).

The client computing device 12, the data storage devices 16(1)-16(2), and the metadata storage device 18 each include a central processing unit (CPU) or processor, a memory, and an interface or I/O system, which are coupled together by a bus or other link, although each could comprise other numbers and types of elements and component, such as control logic. The client computing device 12, in this example, may make requests for and send data to different data storage devices 16(1)-16(2) and interact with metadata storage device 18 via the storage management computing device 14. Generally, the storage management computing device 14 process requests received from the requesting client computing device 12 for files or directories on one or more of the data storage devices 16(1)-16(2) using metadata stored in metadata storage server 18. The data storage devices 16(1)-16(2) may provide data or receive data in response to the received request.

Although examples of the storage management computing device 14, the client computing device 12, the data storage devices 16(1)-16(2), and the metadata storage device 18 are described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein. Exemplary methods for seamless storage import will now be described herein.

Figure 2:
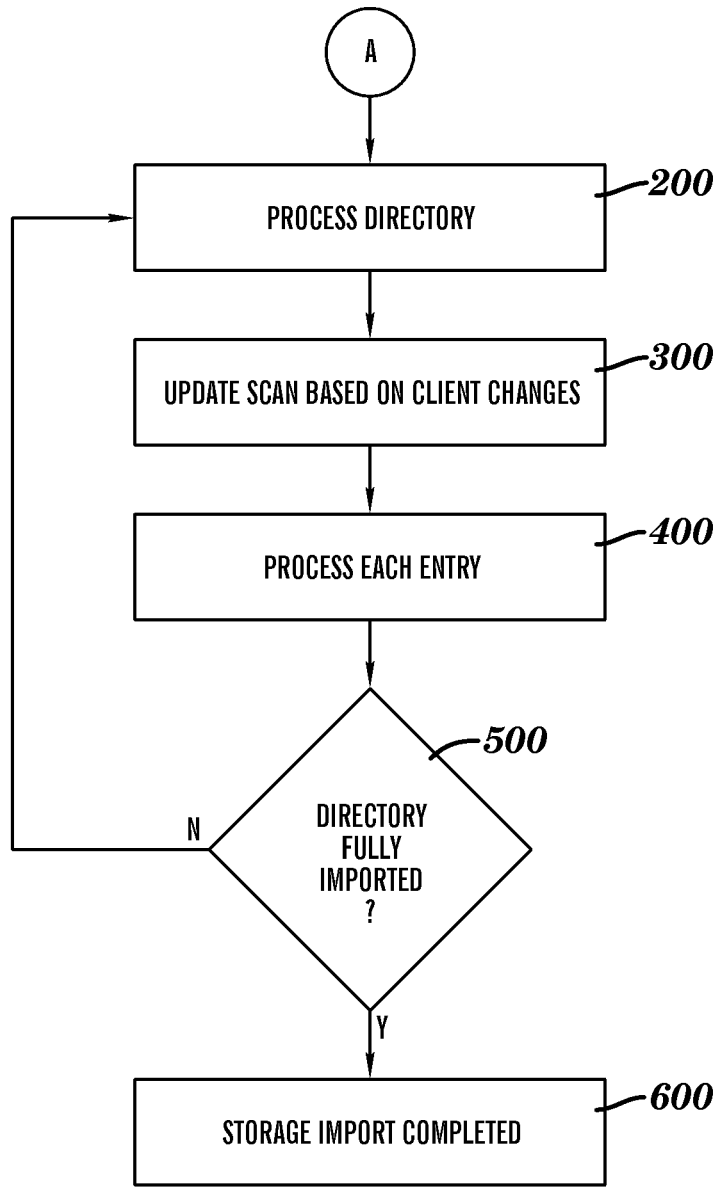
FIG. 2 is a flowchart of an exemplary method for seamless storage importing.
Figure 3:
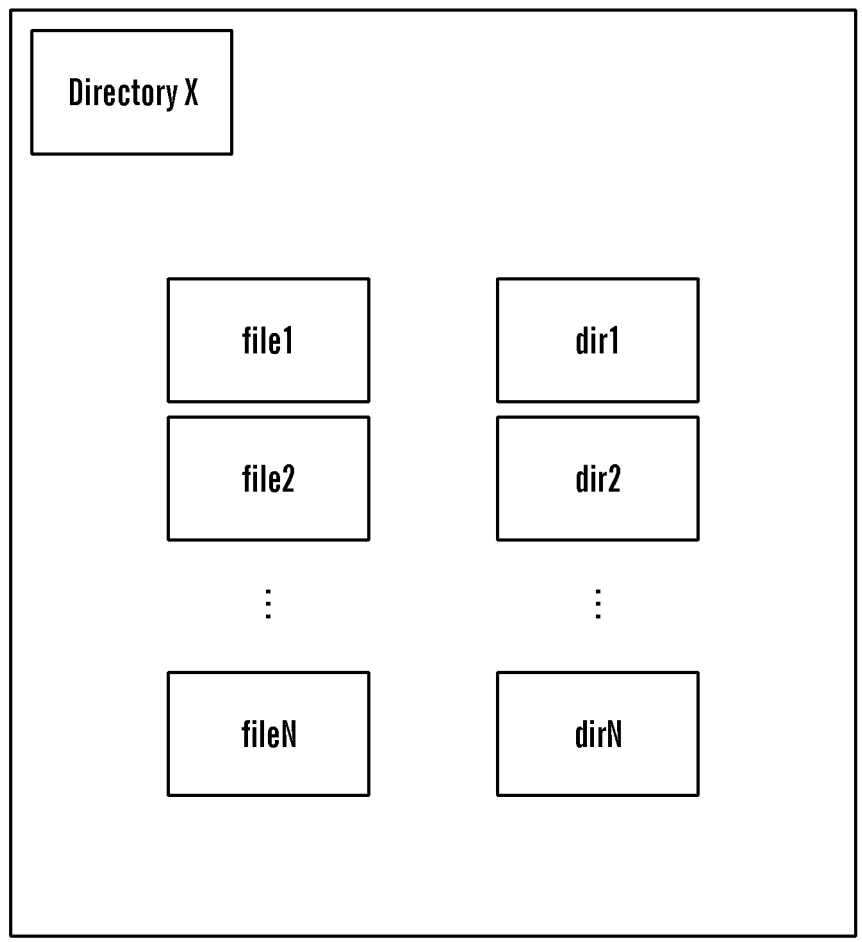
FIG. 3 is an example of a directory to import.

An exemplary method for seamless storage importing will now be described with reference to FIGS. 1-10. Referring more specifically to FIG. 2, in step 200 the storage management computing device 14 begins to process an exemplary directory illustrated in FIG. 3. This exemplary directory includes a plurality of files (file1-fileN) and a plurality of directories (dir1-dirN), although the directory could comprise other numbers and types of structures.

Figure 4:
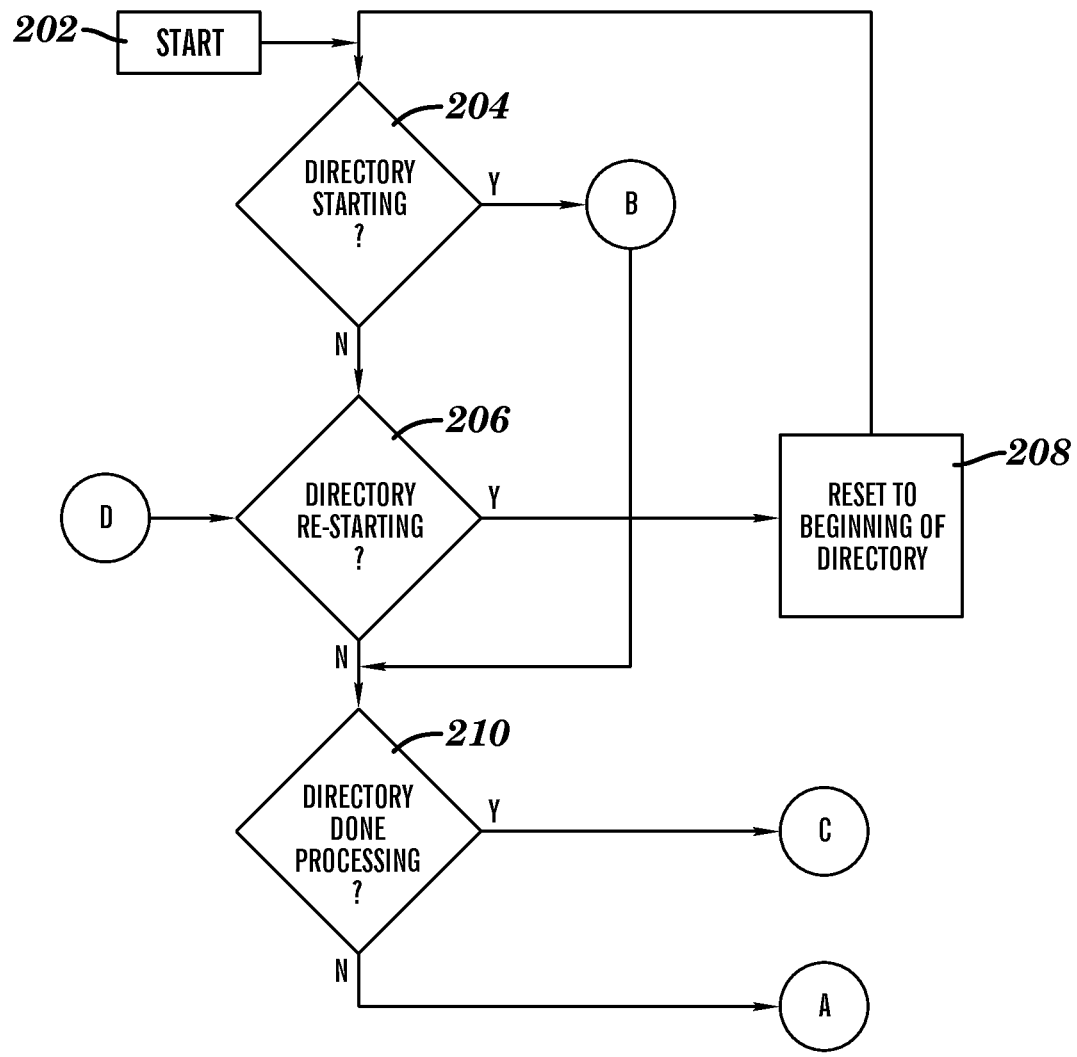
FIG. 4 is a flowchart of an exemplary method for processing of a directory.

The exemplary processing of the directory in step 200 of FIG. 2 is described in greater detail with reference to FIGS. 4-6. Referring more specifically to FIG. 4, in step 202 the processing of the directory by the storage management computing device 14. Next, in step 204 the storage management computing device 14 determines whether processing of a new directory has started. If in step 204 the storage management computing device 14 determines processing of a new directory has been started, then the Yes branch is taken to B at the start of the flowchart shown in FIG. 5.

Figure 5:
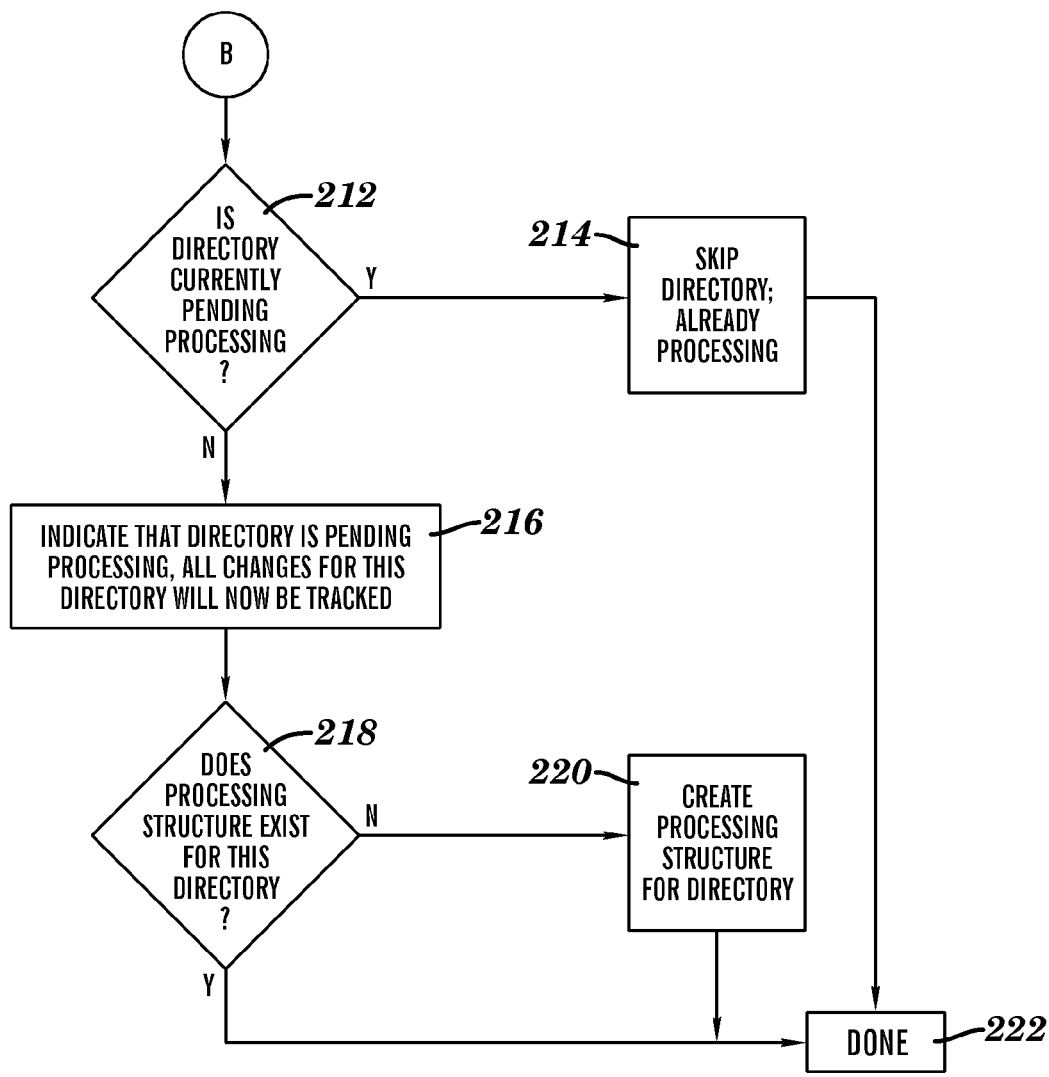
FIG. 5 is a flowchart of an exemplary method for managing the start of processing of a directory.

Referring to FIG. 5, in step 212 the storage management computing device 14 determines whether the directory is already being processed. If in step 212 the storage management computing device 14 determines the directory currently being imported is already being processed, then the Yes branch is taken to step 214. In step 214, the storage management computing device 14 skips initiating any new processing with respect to this directory. Next, in step 222 this portion of the processing the directory is done and the storage management computing device 14 returns to step 210 in FIG. 4.

If in step 212 the storage management computing device 14 determines the directory currently being imported is not already being processed, then the No branch is taken to step 216. In step 216, the storage management computing device 14 indicates that the directory currently being imported is now being processed and initiates tracking all changes to this directory, such as by a file operation received from the client device 12 by way of example only.

In step 218, the storage management computing device 14 determines whether a processing structure for this directory currently being imported exists. If in step 218 the storage management computing device 14 determines a processing structure for this directory currently being imported does not exist, then the No branch is taken to step 220. In step 220, the storage management computing device 14 creates a processing structure for this directory currently being imported and then proceeds to step 222 where this portion of the step of processing the directory in step 200 in FIG. 2 is done. If in step 218 the storage management computing device 14 determines a processing structure for this directory currently being imported does exist, then the Yes branch is taken to step 222. Next, in step 222 this portion of the processing the directory is done and the storage management computing device 14 returns to step 210 in FIG. 4.

Referring back to FIG. 4, if in step 204 the storage management computing device 14 determines processing of a new directory has not been started, then the No branch is taken to step 206. In step 206, the storage management computing device 14 determines whether the directory currently being processed is restarting processing. If in step 206 the storage management computing device 14 determines the directory currently being processed is restarting, then the Yes branch is taken to step 208. In step 208, the storage management computing device 14 resets the processing back to the beginning of the directory and returns to step 204.

If in step 206 the storage management computing device 14 determines the directory currently being processed is not restarting, then the No branch is taken to step 210. In step 210, the storage management computing device 14 determines whether processing of the directory currently being imported is done. If in step 210, the storage management computing device 14 determines that processing of the directory currently being imported is done, then the Yes branch is taken to C at the start of the flowchart shown in FIG. 6.

Figure 6:
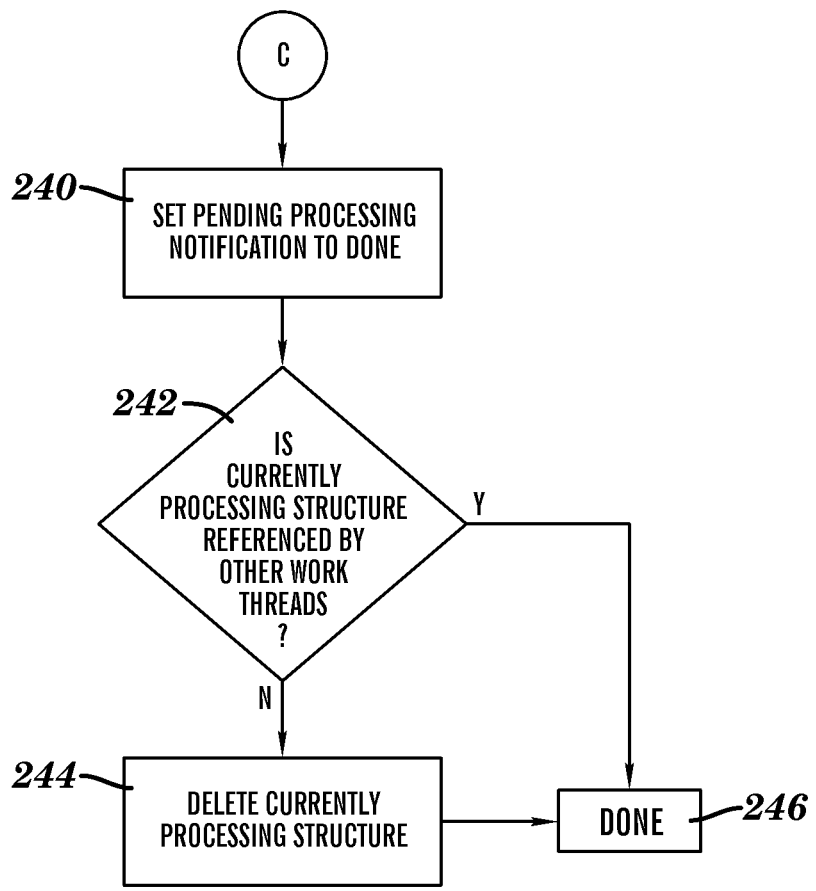
FIG. 6 is a flowchart of an exemplary method for managing the completion of processing of a directory.

Referring to FIG. 6, in step 240, the storage management computing device 14 sets the pending processing notification for the directory currently being processed to a done state. In step 242, the storage management computing device 14 determines whether the processing structure established for the directory currently being process is referenced by any other work threads for other directories. If in step 242, the storage management computing device 14 determines the processing structure is referenced by another work thread, then the Yes branch is taken to step 246 where this portion of the step of processing the directory in step 200 in FIG. 2 is done.

If in step 242, the storage management computing device 14 determines the processing structure is not referenced by another work thread, then the No branch is taken to step 244. In step 244, the storage management computing device 14 deletes this processing structure for the directory which was currently being processed and then proceeds to step 246 where this portion of the step of processing the directory in step 200 in FIG. 2 is done.

Referring back to FIG. 4, if in step 210, the storage management computing device 14 determines processing of the directory currently being imported is not done, then the No branch is taken to A back at the start of the flowchart shown in FIG. 2.

Referring back to FIG. 2, after the processing of the directory in step 200 and as described in greater detail with reference to FIGS. 4-6, the storage management computing device 14 proceeds to step 300. In step 300, the storage management computing device 14 updates the scan based on any changes resulting from one or more file operations initiated by the client computing device 12, although the changes can occur in other manners from operations initiated by other devices.

Figure 7:
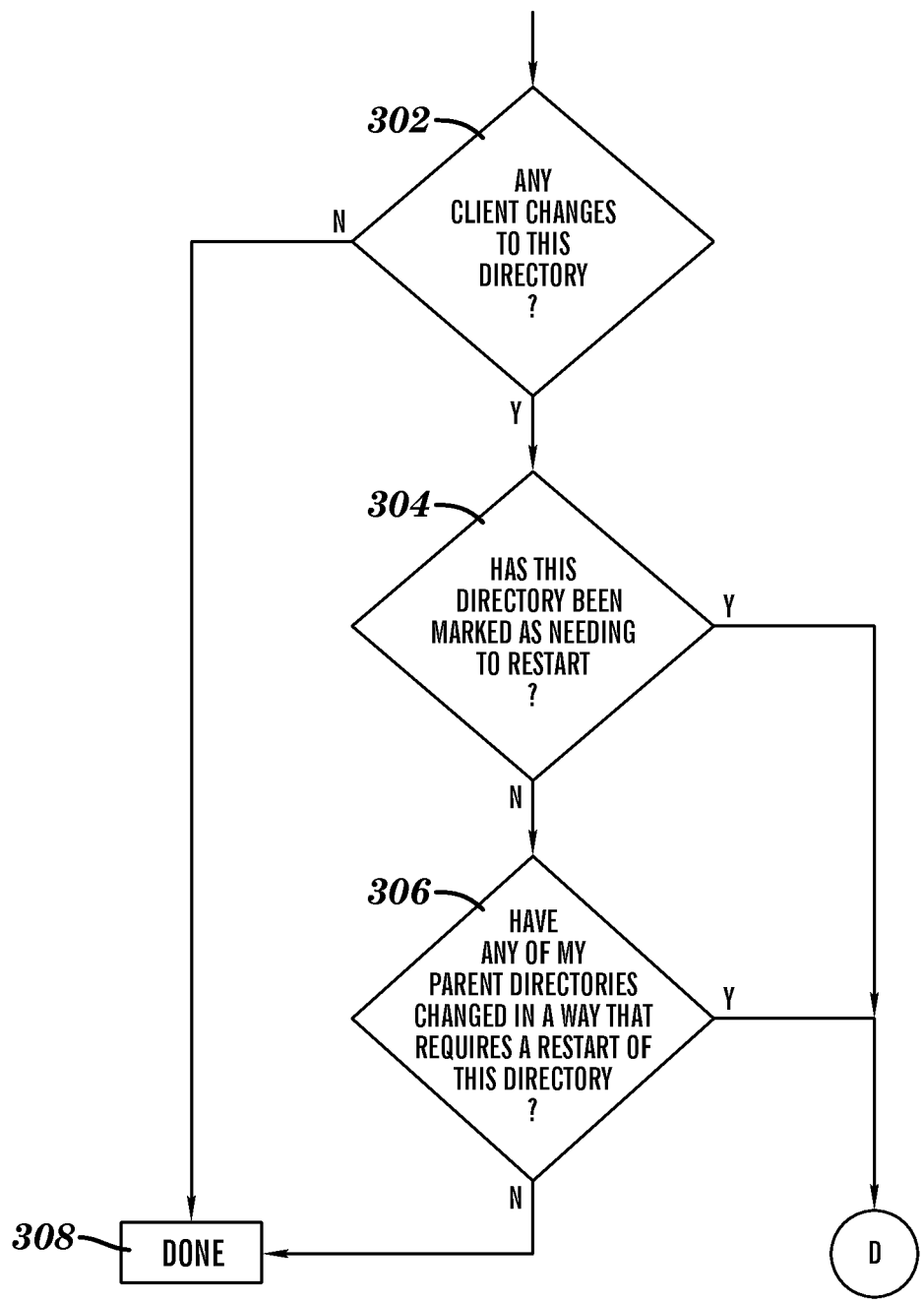
FIG. 7 is a flowchart of an exemplary method for updating a scan based on one or more client changes during importing.

Referring more specifically to FIG. 7, in step 302 the storage management computing device 12 determines whether any changes have been made to the directory which currently is being processed by the client device 12 or other device or system. If in step 302, the storage management computing device 12 determines one or more changes have not been made to the directory which currently is being processed, then the No branch is taken to step 308 where this portion of the step of processing the directory in step 300 in FIG. 2 is done.

If in step 302, the storage management computing device 12 determines one or more changes have been made to the directory which currently is being processed, then the Yes branch is taken to step 304. In step 304, the storage management computing device 14 determines whether this directory currently being processed has been marked or otherwise identified as requiring a restart because of a change by the client computing device 12 or other device. If in step 304, the storage management computing device 14 determines this directory currently being processed has been marked or otherwise identified as requiring a restart, then the Yes branch is taken to D in FIG. 4 where a directory restart process starts in step 206.

If in step 304, the storage management computing device 14 determines this directory currently being processed has not been marked or otherwise identified as requiring a restart, then the No branch is taken to step 306. In step 306, the storage management computing device 14 determines whether any of the parent directories to the directory currently being processed have any changes that require a restart of this directory. If in step 306, the storage management computing device 14 determines none of the parent directories has any changes that requires a restart of this directory, then the No branch is taken to step 308 where this portion of the step of processing the directory in step 300 in FIG. 2 is done.

If in step 306, the storage management computing device 14 determines one or more of the parent directories has one or more changes that requires a restart of this directory, then the Yes branch is taken to D in FIG. 4 where a directory restart process starts in step 206.

Referring back to FIG. 2, after updating the scan based on any changes resulting from one or more file operations initiated by the client computing device 12 in step 300 and as described in greater detail with reference to FIG. 7, the storage management computing device 14 proceeds to step 400. In step 400, the storage management computing device 14 processes each entry in the directory.

Figure 8:
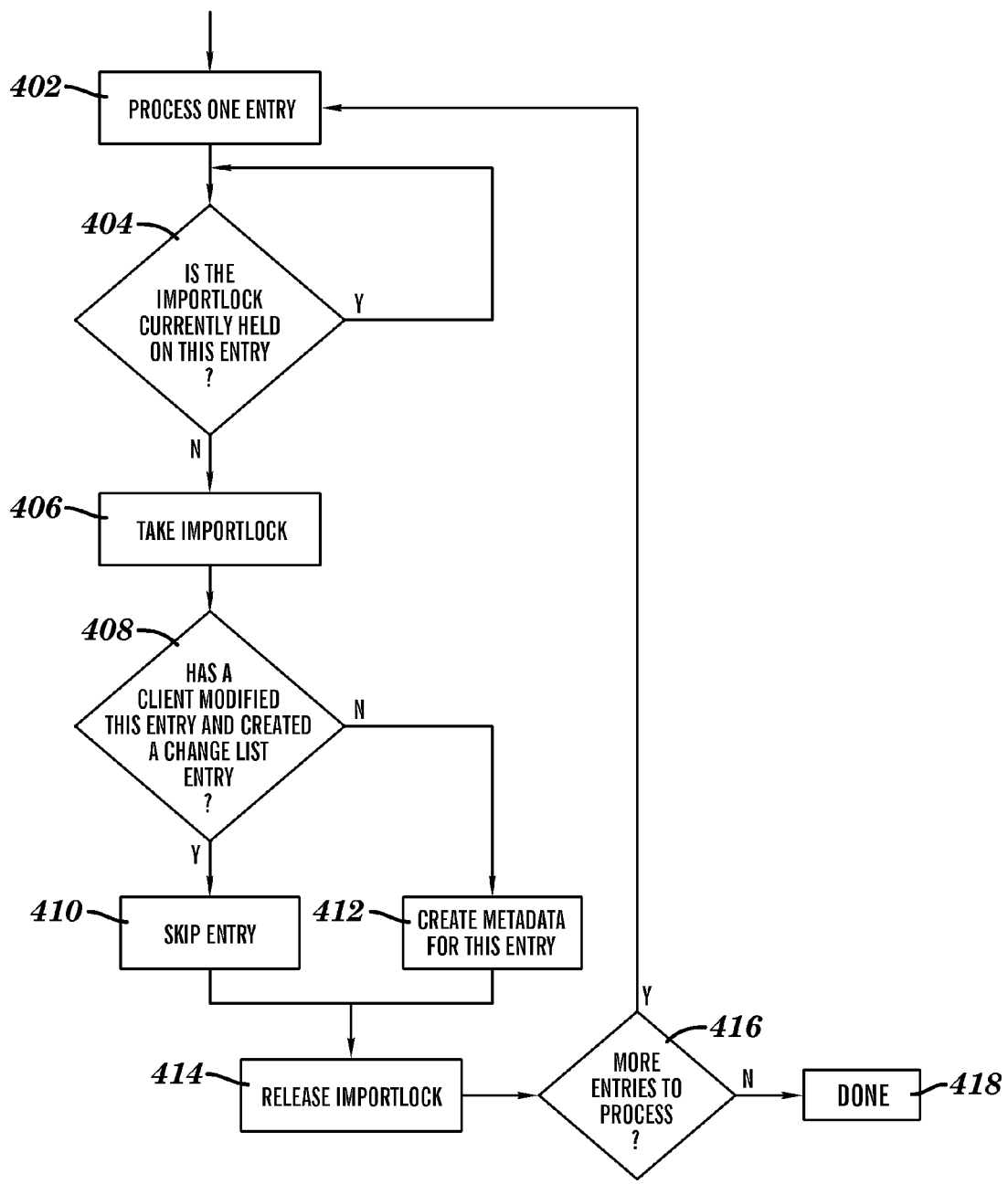
FIG. 8 is a flowchart of an exemplary method for processing each entry in a directory.

Referring more specifically to FIG. 8, in step 402, the storage management computing device 14 begins to process each entry in the directory currently being processed for importation. In step 404, the storage management computing device 14 determines whether there is an importlock currently being held on the entry in the directory being processed. If in step 404, the storage management computing device 14 determines there is an importlock currently being held on the entry in the directory being processed, then the Yes branch is taken to step 404 until the importlock is released or a programmed period of time expires.

If in step 404, the storage management computing device 14 determines there is a not importlock currently being held on the entry in the directory being processed, then the No branch is taken to step 406. In step 406, the storage management computing device 14 sets an importlock for the entry currently being processed.

In step 408, the storage management computing device 14 determines whether the client device 12 or other device or system has modified this entry or created a change list entry, although other manners for indicating a change to this entry can be used. If in step 408, the storage management computing device 14 determines this entry has been modified or a change list entry has been created, then the Yes branch is taken to step 410. In step 410, the storage management computing device skips this entry.

If in step 408, the storage management computing device 14 determines this entry has not been modified and a change list entry has not been created, then the No branch is taken to step 412. In step 412, the storage management computing device 12 creates metadata for this entry for the importation process. In step 414, the storage management computing device 14 releases the importlock on this entry.

In step 416, the storage management computing device 14 determines whether there are any additional entries in this directory to be processed. If in step 416, the storage management computing device 14 determines there is an additional entry in this directory to be processed, then the Yes branch is taken back to step 402. If in step 416, the storage management computing device 14 determines there is not an additional entry in this directory to be processed, then the No branch is taken back to step 418 where this portion of the step of processing the directory in step 400 in FIG. 2 is done.

Referring back to FIG. 2, after the client computing device 12 processes each entry in the directory in step 400 and as described in greater detail with reference to FIG. 8, the storage management computing device 14 proceeds to step 500.

In step 500, the storage management computing device 14 determines whether the directory has been fully imported. If in step 500, the storage management computing device 14 determines the directory has not been fully imported, then the No branch is taken back to step 200.

If in step 500, the storage management computing device 14 determines the directory has been fully imported, then the Yes branch is taken back to step 600. In step 600, the storage management computing device 14 signals that the seamless storage import process has been completed.

Figure 9:
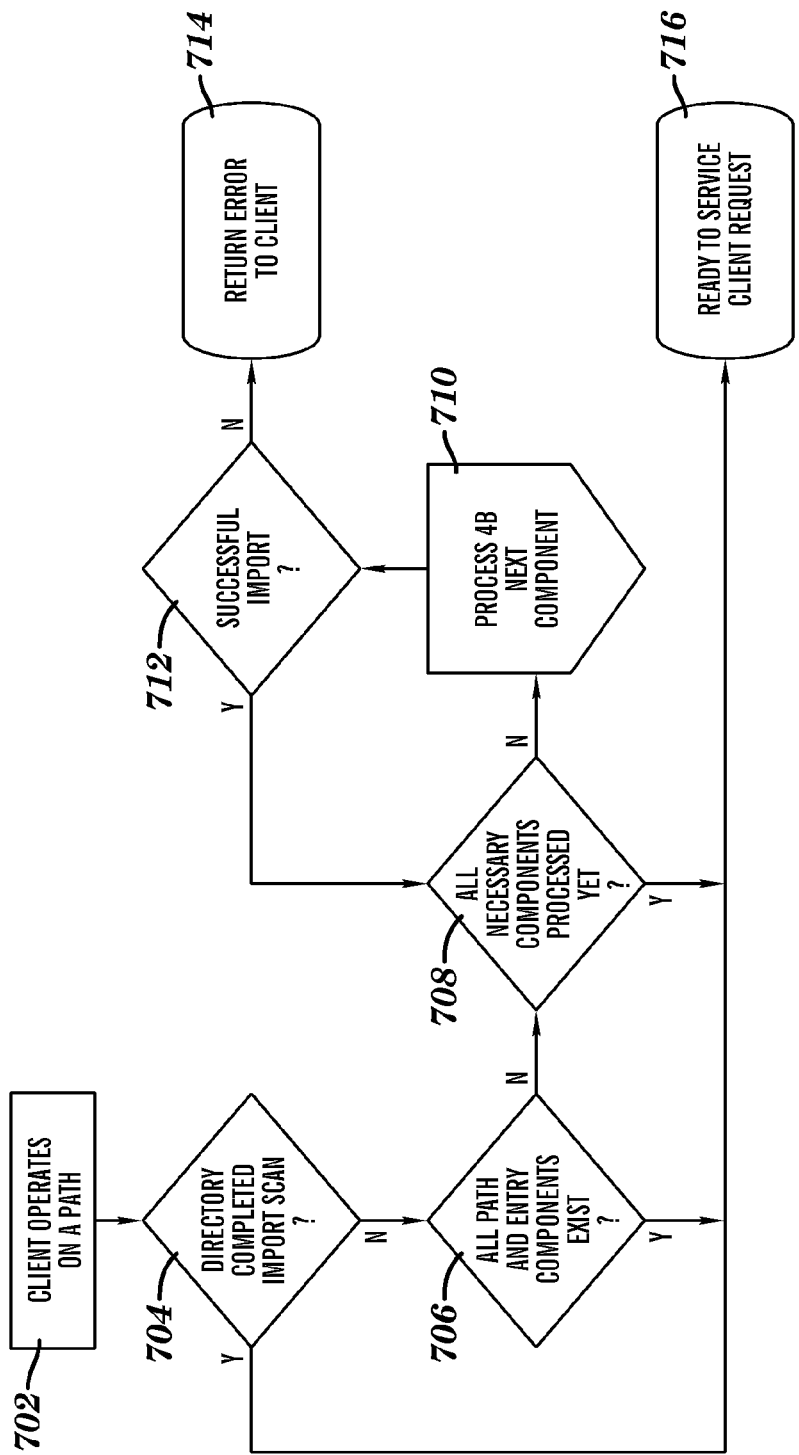
FIG. 9 is a flowchart of an exemplary method for managing importation of a directory during a client operation.

Referring to FIG. 9, an exemplary method for managing importation of a directory during a client operation is illustrated. In step 702, the storage management computing device 14 monitors for and identifies a file operation on a path in a directory by the client device 12.

In step 704, the storage management computing device 14 determines whether the file operation is on a directory which has already completed an import scan. If in step 704, the storage management computing device 14 determines the file operation is on a directory which has already completed an import scan, then the Yes branch is taken to step 716. In step 716, the storage management computing device 14 is ready to service the file operation requested by the client device 12. If in step 704, the storage management computing device 14 determines the file operation is on a directory which has not already completed an import scan, then the No branch is taken to step 706.

In step 706, the storage management computing device 14 determines whether all path and entry components exist for the requested file operation. If in step 706, the storage management computing device 14 determines all path and entry components exist for the requested file operation, then the Yes branch is taken to step 716 as described earlier. If in step 706, the storage management computing device 14 determines all path and entry components do not yet exist for the requested file operation, then the No branch is taken to step 708.

In step 708, the storage management computing device 14 determines whether all necessary components have been processed for the requested file operation. If in step 708, the storage management computing device 14 determines all necessary components have been processed for the requested file operation, then the Yes branch is taken to step 716 as described earlier. If in step 708, the storage management computing device 14 determines all necessary components have not been processed for the requested file operation, then the No branch is taken to step 710.

Figure 10:
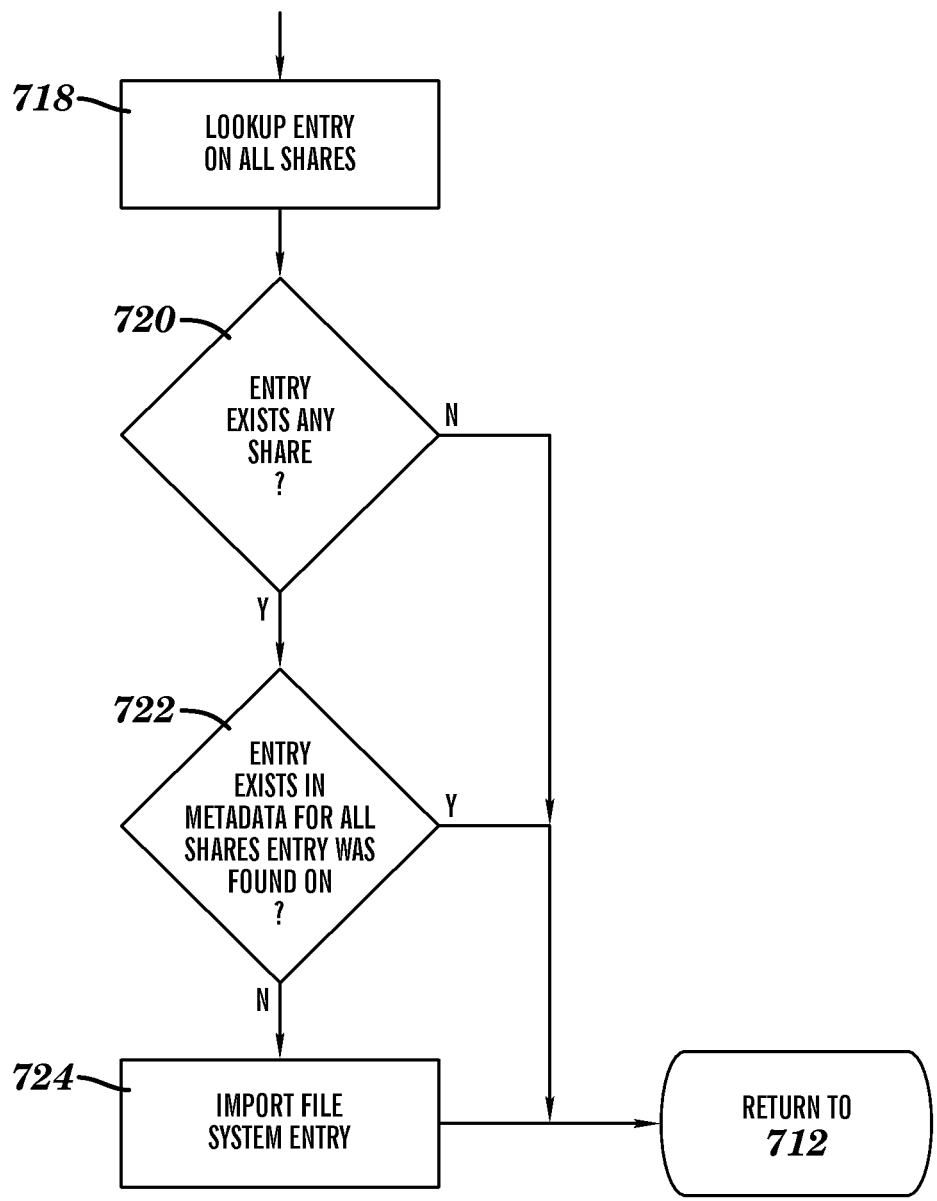
FIG. 10 is a flowchart of an exemplary method for processing the next component.

Referring to FIG. 10, an exemplary method for processing all necessary components in step 710 in FIG. 9 is illustrated. In step 718, the storage management computing device 14 conducts a lookup of the entry for the requested file operation on all shares.

In step 720, the storage management computing device 14 determines whether the entry exists in any share. If in step 720, the storage management computing device 14 determines the entry does not exist on any share, then the No branch is taken back to step 712 in FIG. 9. If back in step 720 in FIG. 10, the storage management computing device 14 determines the entry does exist on one or more shares, then the Yes branch is taken to step 722.

In step 722, the storage management computing device 14 determines whether the entry exists in metadata for all shares the entry was found on. If in step 722, the storage management computing device 14 determines the entry exists in metadata for all shares the entry was found on, then the Yes branch is taken back to step 712 in FIG. 9. If in step 722, the storage management computing device 14 determines the entry does not exist in metadata for all shares the entry was found on, then the No branch is taken back to step 724. In step 724, the storage management computing device 14 imports the file system entry and then proceeds back to step 712 in FIG. 9.

In step 712, the storage management computing device 14 determines whether the importation of the entry was successful. If in step 712, the storage management computing device 14 determines the importation of the entry was not successful then the No branch is taken to step 714. In step 714, the storage management computing device 14 generates an error message which is returned to the client device 12. If in step 712, the storage management computing device 14 determines the importation of the entry was successful then the Yes branch is taken back to step 708 as described in earlier.

Accordingly, as illustrated and described herein this technology provides a number of advantages including providing more effective and efficient methods and devices for seamless storage importing of file systems. With this technology, file system operations are permitted during the storage import process. As a result, clients do not lose access to view or modify their files during the storage import process which could potentially take anywhere from hours to days/weeks. Additionally, while permitting files system operations during storage import, this technology still ensures that all imported file system and metadata entries are accurate.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for seamless storage import, the method comprising:
    importing, by a storage management computing device, file system structure entries stored in one or more storage devices;
    obtaining, by the storage management computing device, a request for an operation on one of the file system structure entries in the one or more storage devices during the importing;
    determining, by the storage management computing device, an import status of the requested one of the file system structure entries, wherein the import status comprises an indication of the existence in the one or more storage devices of all path and entry components for the obtained request;
    processing, by the storage management computing device, the obtained request for an operation based on the determined import status of the requested one of the file system structure entries without interrupting the importing;
    updating, by the storage management computing device, the requested one of the file system structure entries based on the processing; and
    storing, by the storage management computing device, an aggregation of the imported file system structure entries with the updating of the requested one of the file system structure entries.

2. The method as set forth in claim 1, wherein the processing further comprises:
    recording, by the storage management computing device, a changed entry for the requested one of the file system structure entries based on the processing when the determined import status indicates the processing was before the importing, wherein the importing further comprises subsequently importing the changed entry for the requested one of the file system structure entries.

3. The method as set forth in claim 1, wherein the processing further comprises:
    determining an import status indicating the importing of the requested one of the file system structure entries is complete;
    updating the requested one of the file system structure entries and the directory path associated with the requested one of the file system structure entries when the determining indicates the importation of the associated directory path is complete.

4. The method as set forth in claim 1, wherein the processing further comprises:
    delaying the processing of the obtained request for an operation when the determined import status indicates the requested one of the file system structure entries is being imported;
    wherein the processing the obtained request for an operation is completed after the delaying.

5. The method as set forth in claim 4, wherein the processing further comprises:
    determining whether the importing of a directory path associated with the requested one of the file system structure entries is complete when the determined import status indicates the importing of the requested one of the file system structure entries is complete;
    updating the requested one of the file system structure entries and the directory path associated with the requested one of the file system structure entries when the determining indicates the importation of the associated directory path is complete.

6. The method as set forth in claim 5, further comprising queuing one or more additional requests which are obtained until the updating the requested one of the file system structure entries and the directory path associated with the requested one of the file system structure entries is complete.

7. The method as set forth in claim 1, wherein the processing the obtained request for the operation is delayed for a predetermined period of time when the determined import status indicates that the requested one of the file system entries is locked.

8. A non-transitory computer readable medium having stored thereon instructions for seamless storage import comprising machine executable code which when executed by at least one processor, causes the processor to perform steps comprising:
    importing file system structure entries stored in one or more storage devices;
    obtaining a request for an operation on one of the file system structure entries in the one or more storage devices during the importing;
    determining an import status of the requested one of the file system structure entries, wherein the import status comprises an indication of the existence in the one or more storage devices of all path and entry components for the obtained request;

processing the obtained request for an operation based on the determined import status of the requested one of the file system structure entries without interrupting the importing;

updating the requested one of the file system structure entries based on the processing; and storing an aggregation of the imported file system structure entries with the updating of the requested one of the file system structure entries.

9. The medium as set forth in claim 8, wherein the processing further comprises:

recording a changed entry for the requested one of the file system structure entries based on the processing when the determined import status indicates the processing was before the importing;

wherein the importing further comprises subsequently importing the changed file system structure entry for the requested one of the file system structure entries.

10. The medium as set forth in claim 8, wherein the processing further comprises:

determining whether the importing of a directory path associated with the requested one of the file system structure entries is complete when the determined import status indicates the importing of the requested one of the file system structure entries is complete;

updating the requested one of the file system structure entries and the directory path associated with the requested one of the file system structure entries when the determining indicates the importation of the associated directory path is complete.

11. The medium as set forth in claim 8, wherein the processing further comprises:

delaying the processing of the obtained request for an operation when the determined import status indicates the requested one of the file system structure entries is being imported;

wherein the processing the obtained request for an operation is completed after the delaying.

12. The medium as set forth in claim 11, wherein the processing further comprises:

determining whether the importing of a directory path associated with the requested one of the file system structure entries is complete when the determined import status indicates the importing of the requested one of the file system structure entries is complete;

updating the requested one of the file system structure entries and the directory path associated with the requested one of the file system structure entries when the determining indicates the importation of the associated directory path is complete.

13. The medium as set forth in claim 12, further comprising queuing one or more additional requests which are obtained until the updating the requested one of the file system structure entries and the directory path associated with the requested one of the file system structure entries is complete.

14. The medium as set forth in claim 8, wherein the processing the obtained request for the operation is delayed for a predetermined period of time when the determined import status indicates that the requested one of the file system entries is locked.

15. A storage management computing device comprising:
one or more processors;
a memory coupled to the one or more processors which are configured to be capable of executing programmed instructions stored in the memory comprising and stored in the memory to:

import file system structure entries stored in one or more storage devices;

obtain a request for an operation on one of the file system structure entries in the one or more storage devices during the importing;

determine an import status of the requested one of the file system structure entries, wherein the import status comprises an indication of the existence in the one or more storage devices of all path and entry components for the obtained request;

process the obtained request for an operation based on the determined import status of the requested one of the file system structure entries without interrupting the importing;

update the requested one of the file system structure entries based on the processing; and storing an aggregation of the imported file system structure entries with the updating of the requested one of the file system structure entries.

16. The device as set forth in claim 15, wherein the one or more processors is further configured to be capable of executing programmed instructions stored in the memory for the processing further comprising and stored in the memory to:

record a changed entry for the requested one of the file system structure entries based on the processing when the determined import status indicates the processing was before the importing, wherein the importing further comprises subsequently importing the changed file system structure entry for the requested one of the file system structure entries.

17. The device as set forth in claim 15, wherein the one or more processors is further configured to be capable of executing programmed instructions stored in the memory for the processing further comprising and stored in the memory to:

determine whether the importing of a directory path associated with the requested one of the file system structure entries is complete when the determined import status indicates the importing of the requested one of the file system structure entries is complete;

update the requested one of the file system structure entries and the directory path associated with the requested one of the file system structure entries when the determining indicates the importation of the associated directory path is complete.

18. The device as set forth in claim 15, wherein the one or more processors is further configured to be capable of executing programmed instructions stored in the memory for the processing further comprising and stored in the memory to:

delay the processing of the obtained request for an operation when the determined import status indicates the requested one of the file system structure entries is being imported;

wherein the processing the obtained request for an operation is completed after the delaying.

19. The device as set forth in claim 18, wherein the one or more processors is further configured to be capable of executing programmed instructions stored in the memory for the processing further comprising and stored in the memory to:

determine whether the importing of a directory path associated with the requested one of the file system structure entries is complete when the determined import status indicates the importing of the requested one of the file system structure entries is complete;

update the requested one of the file system structure entries and the directory path associated with the requested one of the file system structure entries when the determining indicates the importation of the associated directory path is complete.

20. The device as set forth in claim 19, wherein the one or more processors is further configured to be capable of executing programmed instructions stored in the memory further comprising and stored in the memory to:

queue one or more additional requests which are obtained until the updating the requested one of the file system structure entries and the directory path associated with the requested one of the file system structure entries is complete.

21. The device as set forth in claim 15, wherein the processing the obtained request for the operation is delayed for a predetermined period of time when the determined import status indicates that the requested one of the file system entries is locked.

* * * * *